Dec. 15, 1959  B. G. ONKEN  2,917,234
ADDING AND SUBTRACTING MEANS
Filed Aug. 17, 1956

INVENTOR.
BERT G. ONKEN
BY

United States Patent Office 2,917,234
Patented Dec. 15, 1959

2,917,234

ADDING AND SUBTRACTING MEANS

Bert G. Onken, Wantagh, N.Y.

Application August 17, 1956, Serial No. 604,773

2 Claims. (Cl. 235—66)

This invention relates to pocket calculating means and more particularly to means for adding and subtracting.

The present invention comprises a small compact pocket size calculating device comprising a cylindrical case having a first scale parallel the axis and a circumferential scale at one end, a knob rotatably mounted at one end of the case and having an index mark thereon, an indexing arm rotatably mounted on said knob, a lead screw operatively fixedly connected to said knob and axially traveling index means mounted on said lead screw having an index mark adjacent said first scale.

The present invention is primarily designed for adding and subtracting but could be used for other functions by the addition of the proper scales.

Accordingly, a principal object of the invention is to provide new and improved calculating means.

Another object of the invention is to provide new and improved calculating means for adding and subtracting.

Another object of the invention is to provide new and improved calculating means, for adding and subtracting, of the lead screw type.

Another object of the invention is to provide a pocket size calculating device which is durable, easy and economical to manufacture.

These and other objects of the invention will be apparent from the following specification and drawings, of which:

Figure 2:
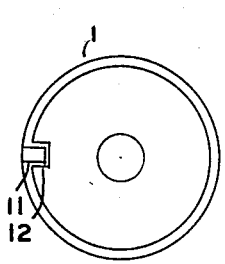
Figure 2 is a sectional view of the embodiment of Figure 1.
Figure 1:
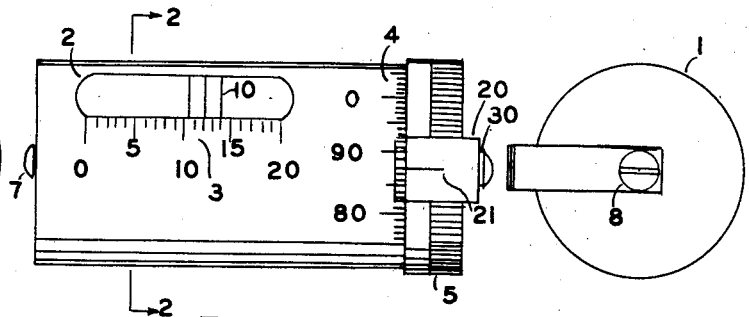
Figure 1 is a side view of an embodiment of the invention.
Figure 3:
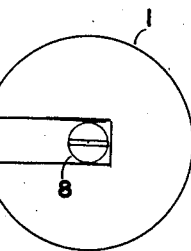
Figure 3 is an end view of the embodiment of Figure 1.
Figure 4:
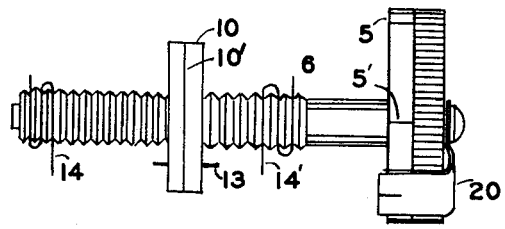
Figure 4 is a detail view of the invention.

Referring to the drawings, the invention comprises a cylindrical case 1 which may be of plastic and which may be transparent or have a window 2 along one side. The case 1 has two scales, a first scale 3 parallel the axis and a second scale 4 around the circumference at one end. A knob 5 is rotatably mounted at one end of the case 1 and is operatively fixedly connected to a lead screw 6. The lead screw may be rotatably mounted in the case 1 by means of the screws 7 and 8. The knob 5 has an index mark 5′ which is adjacent the scale 4.

A travelling index means 10 is mounted on the lead screw 6 and has an index mark 10′ adjacent the first scale 3. The means 10 may be a nut but could be a portion of a nut, a spring clip, or other equivalent means adapted to advance along the threads of the lead screw 6. The nut 10 is prevented from rotating by a projection 11 or equivalent stop which is fixed to the casing 1 and which engages a notch 12 in the nut 10. A suitable stop may be provided so that the indicating mounting 10 will stop on the 0 point on the scale 3. This stop may be a pin 13 which is adapted to contact a wire or pin 14 connected to the lead screw 6. On top of the knob 5 is located a rotatable arm 20 which contains an index mark 21. A similar stop 14′ is preferably added at the other end.

The operation of the device is as follows: The stop 14 is set on the lead screw so that the index mark 10′ will be at 0 position on the scale 3 and the knob 5 is fixed to the lead screw so that the index mark 5′ will be at the 0 of the scale 4.

To add, rotate the arm 20 so that the index mark 21 lines up with the 0 on the circumferential scale 4. Now rotate the knob and arm until the index 21 coincides with the desired number on the scale 4. The arm will turn automatically with the knob. Now rotate the arm 20 back to 0. Again rotate the knob in the same direction to the next number that is to be added. When all the numbers have been inserted in this fashion, the total may be read on the scale 4 opposite the index mark 10′ for a rough figure.

Proper operating of this device depends on the condition that the restraining force between knob 5 and case 1 is always greater than the restraining force between arm 20 and knob 5 and/or between arm 20 and lead screw 6. A washer 30 is preferably inserted between arm 20 and the screw head to accomplish this.

If a more accurate figure is desired, it may be read on the scale 4 opposite the index 5′ on the knob. The scale 4 may be used for units and tens and the scale 3 for hundreds.

To subtract from a number inserted rotate the arm 20 on the scale 4 to the number that is to be subtracted. Then rotate the knob 5 in the opposite to adding direction until the index 21 is set on 0. The result may then be read on the scales 3 and 4 as explained above.

The left side of lead screw 6 is preferably shouldered and passes thru case so that screw 7 can be brought home against lead screw, resulting in tight screw 7 and rotational freedom for lead screw within case.

Arm 20 may be utilized as a carrying clip to fit over a pocket or fold in clothing, and a neck-band could be added to device for convenience.

While the present invention has been illustrated for addition and subtraction, other functions such as multiplication and division could be performed with logarithmic scales. Other special scales could be devised for special processes. The present invention has a minimum amount of mechanical parts and eliminates all ratchets and pawl mechanisms and miscellaneous gearing which are used in prior devices of this general type.

I claim:

1. Adding and subtracting means comprising a cylindrical case having a first scale parallel the axis and a circumferential scale at one end, a knob reversibly rotatably mounted at one end of said case, said knob having an index mark adjacent said circumferential scale, means to zero at intermediate steps including an index arm reversibly rotatably mounted on said knob and having an index mark adjacent said circumferential scale, a lead screw fixedly connected to said knob, and axially traveling index means mounted on said lead screw and having an index mark adjacent said first scale.

2. Adding and subtracting means comprising a transparent cylindrical case having a first scale parallel the axis and a circumferential scale at one end, a knob reversibly rotatably mounted at one end of said case said knob having an index mark adjacent said circumferential scale, an index arm reversibly rotatably mounted on said knob and having an index mark adjacent said circumferential scale, a lead screw fixedly connected to said knob, and threaded means mounted on said lead screw and having an index mark adjacent said first scale.

References Cited in the file of this patent

UNITED STATES PATENTS

| | | |
|---|---|---|
| 37,755 | Hoffman | Feb. 24, 1863 |
| 175,775 | Smith et al. | Apr. 4, 1876 |
| 180,949 | Smith | Aug. 8, 1876 |
| 528,596 | Hicks | Nov. 6, 1894 |
| 706,048 | Graham | Aug. 5, 1902 |